US012730499B2

(12) United States Patent
Weng et al.

(10) Patent No.: US 12,730,499 B2
(45) Date of Patent: Sep. 8, 2026

(54) ELECTRONIC DEVICE AND CONTROL METHOD THEREOF

(71) Applicants: Innolux Corporation, Miaoli County (TW); CARUX TECHNOLOGY PTE. LTD., Singapore (SG)

(72) Inventors: Tsan-Po Weng, Tainan (TW); Tsung-Hsien Huang, Tainan (TW); Wei-Han Tsao, Tainan (TW); Nai-Fang Hsu, Miaoli County (TW); Ai-Ling Kuo, Miaoli County (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 19/080,967

(22) Filed: Mar. 17, 2025

(65) Prior Publication Data

US 2025/0321631 A1 Oct. 16, 2025

(30) Foreign Application Priority Data

Apr. 16, 2024 (CN) ........................ 202410456840.2

(51) Int. Cl.
*G06F 3/01* (2006.01)
*B60K 35/22* (2024.01)
(Continued)

(52) U.S. Cl.
CPC .............. *G06F 3/011* (2013.01); *B60K 35/22* (2024.01); *B60K 35/654* (2024.01);
(Continued)

(58) Field of Classification Search
CPC ...................................................... B60K 35/22
See application file for complete search history.

(56) References Cited

U.S. PATENT DOCUMENTS

2006/0044214 A1* 3/2006 Hong ..................... H04N 5/775 345/1.1
2007/0006081 A1* 1/2007 Maehata .................. H04S 7/00 715/727

(Continued)

FOREIGN PATENT DOCUMENTS

CN 110099836 12/2022
CN 115718544 2/2023

(Continued)

*Primary Examiner* — Nan-Ying Yang
(74) *Attorney, Agent, or Firm* — JCIPRNET

(57) ABSTRACT

Disclosed is an electronic device adaptable for vehicles. The electronic device includes a first sensing device, a storage unit, a control unit and a display device. The first sensing device senses the first passenger and the second passenger sitting in the vehicle to obtain sensing information. The sensing information includes the first position of the first passenger and the second position of the second passenger. The storage unit stores storage information. The storage information includes a first permission corresponding to the first position and a second permission corresponding to the second position. The control unit determines that the first passenger has the first permission and determines that the second passenger has the second permission based on the sensing information and the storage information.

18 Claims, 11 Drawing Sheets

300

(51) Int. Cl.

| | |
|---|---|
| ***B60K 35/65*** | (2024.01) |
| ***B60K 35/81*** | (2024.01) |
| ***H04W 4/48*** | (2018.01) |

(52) U.S. Cl.

CPC ............ *B60K 35/656* (2024.01); *B60K 35/81* (2024.01); *H04W 4/48* (2018.02); *B60K 2360/175* (2024.01); *B60K 2360/197* (2024.01); *B60K 2360/741* (2024.01)

(56) References Cited

U.S. PATENT DOCUMENTS

| | | | | |
|---|---|---|---|---|
| 2018/0170181 | A1* | 6/2018 | Tan | B60K 35/81 |
| 2019/0025577 | A1* | 1/2019 | Tamura | B60K 35/22 |
| 2021/0237754 | A1* | 8/2021 | Shiba | B60W 60/0051 |
| 2021/0354559 | A1* | 11/2021 | Kim | B60W 50/14 |
| 2022/0206733 | A1 | 6/2022 | Hsiao et al. | |
| 2022/0244585 | A1 | 8/2022 | Hsieh et al. | |
| 2023/0040240 | A1 | 2/2023 | Hsiao et al. | |
| 2023/0354521 | A1 | 11/2023 | Nien et al. | |
| 2023/0365103 | A1 | 11/2023 | Hsiao et al. | |
| 2023/0373306 | A1 | 11/2023 | Chang et al. | |
| 2024/0021763 | A1 | 1/2024 | Nien et al. | |
| 2024/0038185 | A1 | 2/2024 | Nien et al. | |
| 2024/0200766 | A1 | 6/2024 | Sung et al. | |
| 2024/0367594 | A1 | 11/2024 | Huang et al. | |

FOREIGN PATENT DOCUMENTS

| | | |
|---|---|---|
| CN | 115782575 | 3/2023 |
| CN | 115799225 | 3/2023 |
| CN | 116424242 | 7/2023 |
| CN | 117912386 | 4/2024 |
| TW | 202310500 | 3/2023 |

* cited by examiner

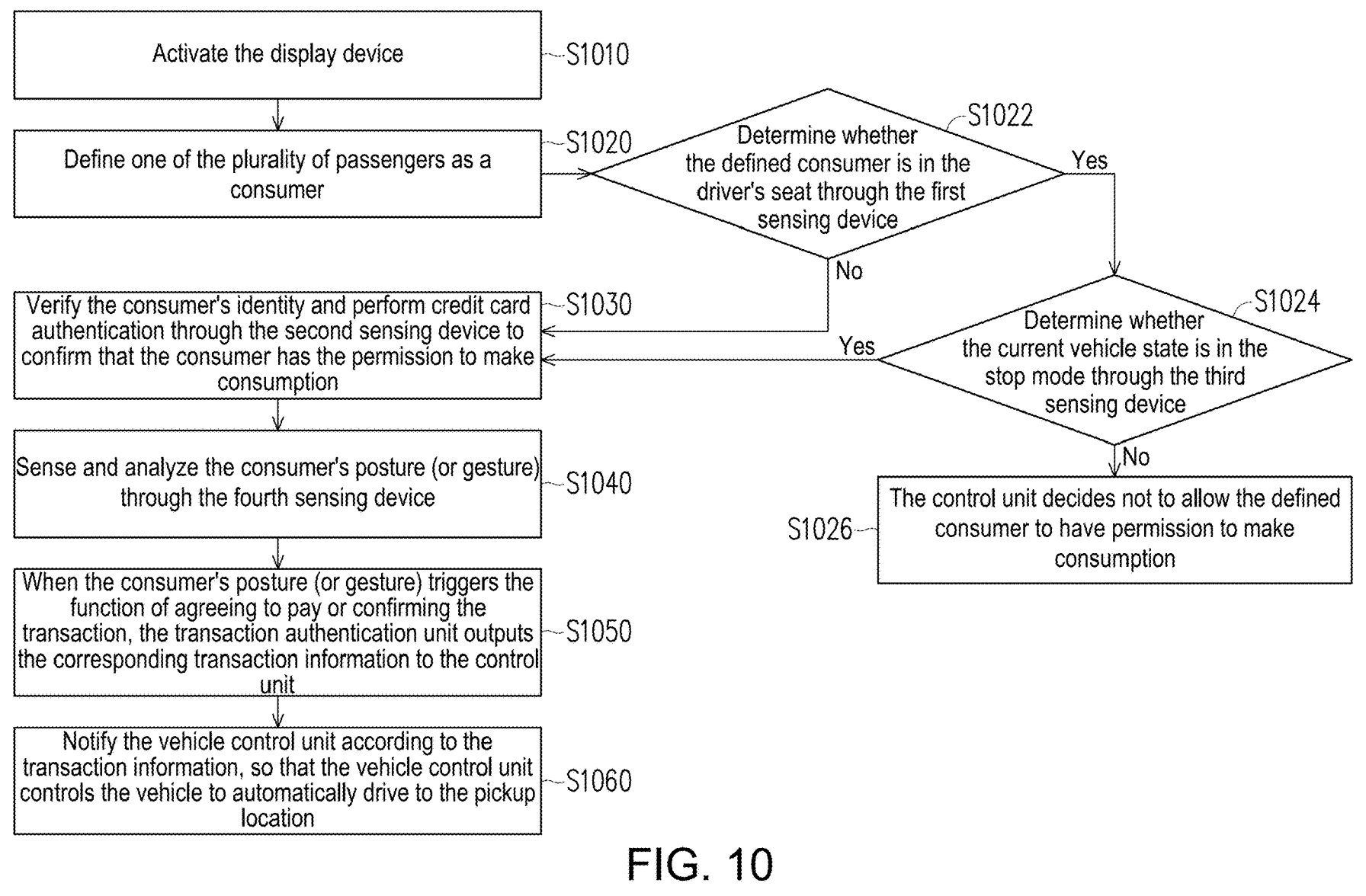

S1010 Activate the display device

S1020 Define one of the plurality of passengers as a consumer

S1022 Determine whether the defined consumer is in the driver's seat through the first sensing device Yes No S1024 Determine whether the current vehicle state is in the stop mode through the third sensing device Yes No S1026 The control unit decides not to allow the defined consumer to have permission to make consumption S1030 Verify the consumer's identity and perform credit card authentication through the second sensing device to confirm that the consumer has the permission to make consumption S1040 Sense and analyze the consumer's posture (or gesture) through the fourth sensing device S1050 When the consumer's posture (or gesture) triggers the function of agreeing to pay or confirming the transaction, the transaction authentication unit outputs the corresponding transaction information to the control unit S1060 Notify the vehicle control unit according to the transaction information, so that the vehicle control unit controls the vehicle to automatically drive to the pickup location

FIG. 10

ELECTRONIC DEVICE AND CONTROL METHOD THEREOF

CROSS-REFERENCE TO RELATED APPLICATION

This application claims the priority benefit of China application serial no. 202410456840.2, filed on Apr. 16, 2024. The entirety of the above-mentioned patent application is hereby incorporated by reference herein and made a part of this specification.

BACKGROUND

Technical Field

The present disclosure relates to an electronic device, and in particular, to an electronic device and a control method thereof applied to a vehicle.

Description of Related Art

Generally, although vehicle display devices disposed in vehicles are able to provide touch control and display functions, the touch control and display functions of the vehicle display device cannot be adjusted depending on the seating arrangement of passengers.

SUMMARY

The present disclosure is directed to an electronic device that is able to achieve a good in-car screen operation experience.

According to embodiments of the present disclosure, the electronic device of the present disclosure is adaptable for vehicles. The electronic device includes a first sensing device, a storage unit, a control unit and a display device. The first sensing device is disposed to sense the first passenger and the second passenger sitting in the vehicle to obtain sensing information. The sensing information includes the first position of the first passenger and the second position of the second passenger. The storage unit is disposed to store storage information. The storage information includes a first permission corresponding to the first position and a second permission corresponding to the second position. The control unit is coupled to the first sensing device and the storage unit, and is disposed to determine that the first passenger has the first permission and determine that the second passenger has the second permission based on the sensing information and the storage information. The display device is coupled to the control unit and includes a first area and a second area. The electronic device has a first mode and a second mode. In the first mode, the first permission includes allowing the first passenger to operate on the first area, and the second permission includes allowing the second passenger to operate on the second area.

According to an embodiment of the present disclosure, the control method of an electronic device of the present disclosure is adaptable for an electronic device disposed in a vehicle. The electronic device includes a display device. The display device includes a first area and a second area. The control method includes the following steps: sensing a first passenger and a second passenger sitting in the vehicle to obtain sensing information, wherein the sensing information includes a first position of the first passenger and a second position of the second passenger; reading storage information, wherein the storage information includes a first permission corresponding to the first position and a second permission corresponding to the second position; and determining that the first passenger has the first permission and determining that the second passenger has the second permission based on the sensing information and the storage information, wherein in the first mode of the vehicle, the first permission includes allowing the first passenger to operate on the first area, and the second permission includes allowing the second passenger to operate on the second area.

Based on the above, the electronic device and the control method thereof in the present disclosure are able to realize a convenient and safe display touch control function in the vehicle according to the passenger's seating arrangement, passenger's identity and driving status.

In order to make the above-mentioned features and advantages of the present disclosure more clear and understandable, embodiments are given below and described in detail with reference to the accompanying drawings.

BRIEF DESCRIPTION OF THE DRAWINGS

FIG. 10 is an operation flow chart of an electronic device according to an embodiment of the present disclosure.

DESCRIPTION OF THE EMBODIMENTS

Figure 1A:
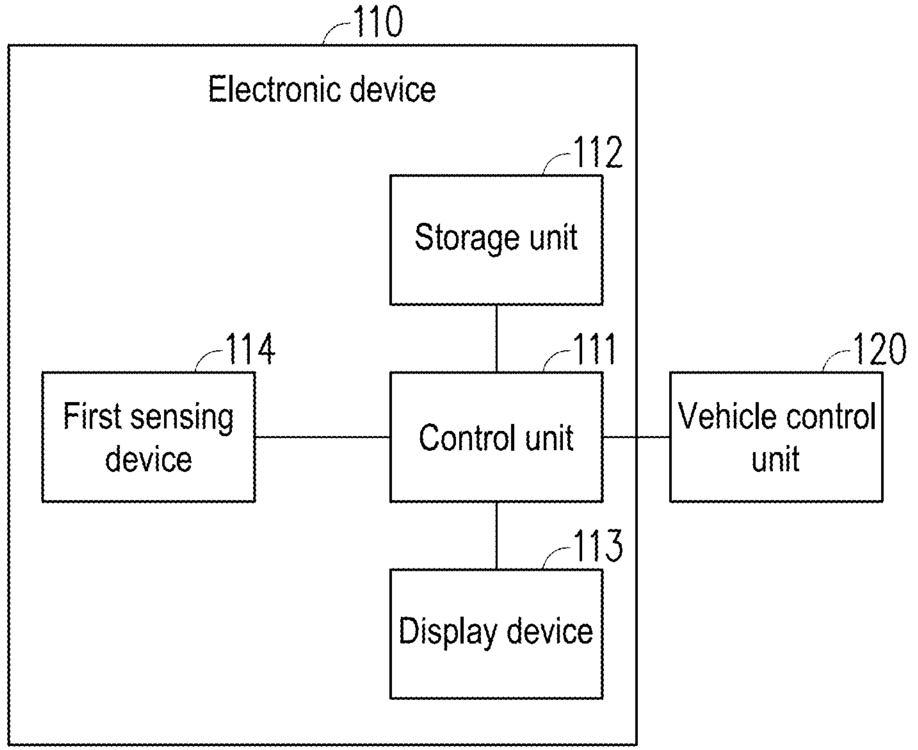
FIG. 1A is a schematic view of an electronic device according to an embodiment of the present disclosure.

Reference will now be made in detail to the exemplary embodiments of the present disclosure, examples of which are illustrated in the accompanying drawings. Whenever possible, the same reference numbers are used in the drawings and description to refer to the same or similar parts.

Throughout this disclosure and the appended claims, certain terms may be used to refer to particular components. Those skilled in the art should understand that electronic device manufacturers may refer to the same components by different names. This specification does not intend to distinguish between components that have the same function but have different names. In the following description and claims, words such as "containing" and "comprising" are open-ended words, so they should be interpreted as meaning "including but not limited to . . . ".

The directional terms mentioned in this specification, such as "up", "down", "front", "rear", "left", "right", etc., only refer to the directions of the drawings. Therefore, the used directional terminology is illustrative, and is not used for limiting the disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or exaggerated for clarity's sake.

In some embodiments of the disclosure, the term "coupled to" may refer to any direct electrical connection or indirect electrical connection. In the case of direct electrical connection, terminals of components on two circuits are directly connected or connected to each other by a conductor line segment, and in the case of indirect electrical connection, there are switches, diodes, capacitors, inductors, resistors, other suitable components, or a combination of the above components between the terminals of the components on the two circuits, but the disclosure is not limited thereto.

The terms "about", "equal to", "equivalent to" or "same", "essentially" or "substantially" are generally interpreted as being within 20% of a given value or range, or interpreted as being within 10%, 5%, 3%, 2%, 1%, or 0.5% of the given value or range.

The ordinal numbers used in the specification and claims, such as "first", "second", etc., are used to modify components, and do not imply and represent that the component or these components have any previous ordinal numbers, and do not represent a sequence of one component with another, or a sequence in a manufacturing method. The use of these ordinal numbers is only to make a clear distinction between one component with a certain name and another component with the same name. The same terms may not be used in the claims and the specification, and accordingly, a first component in the specification may be a second component in the claims. It should be noted that the technical features in several different embodiments may be replaced, recombined, and mixed without departing from the spirit of the present disclosure to complete other embodiments.

Features in various embodiments may be mixed and matched as long as they do not violate the spirit of the disclosure or conflict with each other.

Unless otherwise defined, all terms (including technical and scientific terms) used herein have the same meanings as commonly understood by those skilled in the art to which this disclosure belongs. It is understandable that these terms, such as those defined in commonly used dictionaries, should be interpreted as having meaning consistent with the relevant technology and the background or context of this disclosure, and should not be interpreted in an idealized or excessively formal way, unless there is a special definition in the embodiment of the disclosure.

FIG. 1A is a schematic view of an electronic device according to an embodiment of the present disclosure. Referring to FIG. 1A, a vehicle 100 includes an electronic device 110 and a vehicle control unit (VCU) 120. The electronic device 110 is adaptable for the vehicle 100. The electronic device 110 may be an in-vehicle electronic device and is disposed in the vehicle 100. The electronic device 110 includes a control unit 111, a storage unit 112, a display device 113 and a first sensing device 114.

Figure 3:
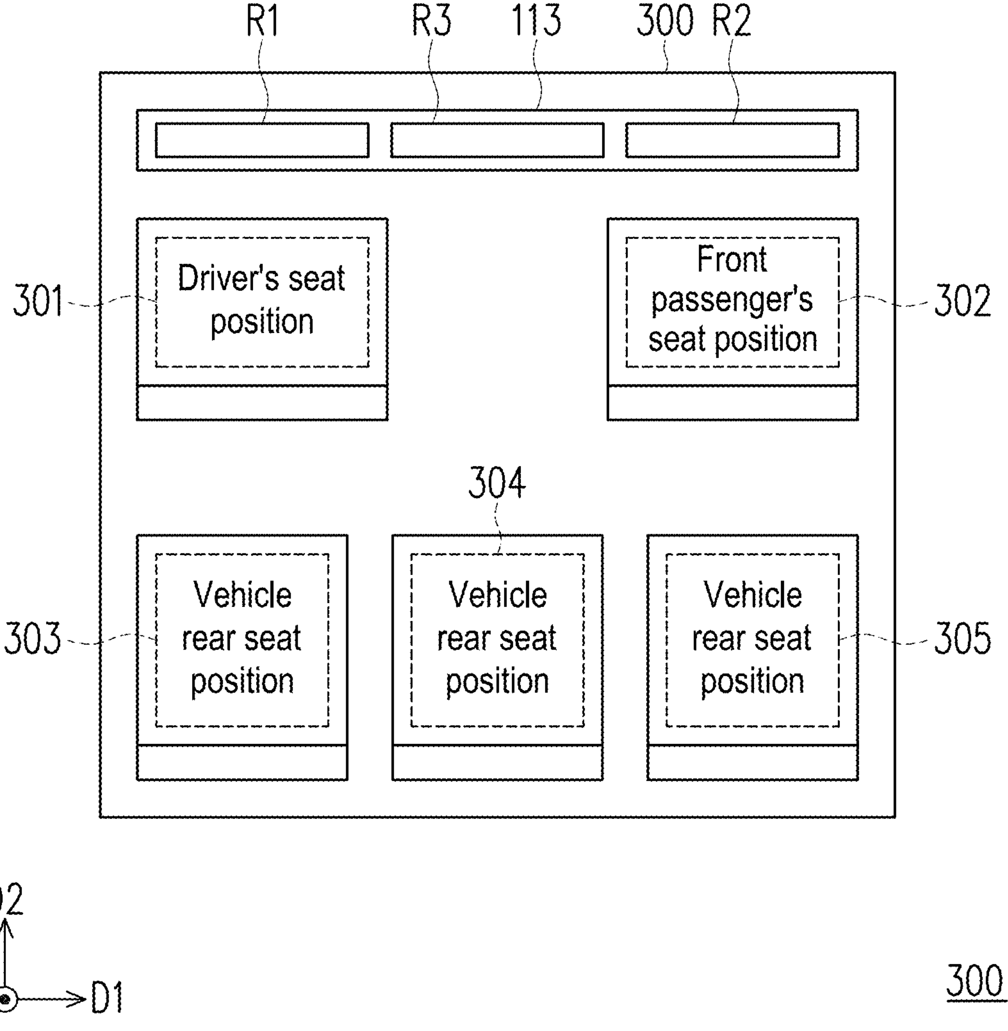
FIG. 3 is a top schematic view of an inner part of a vehicle according to an embodiment of the present disclosure.

As shown in FIG. 1A, in detail, according to some embodiments, the first sensing device 114 may be disposed to sense the first passenger and the second passenger sitting in the vehicle 100 to obtain sensing information. Referring to FIG. 1A and FIG. 3 simultaneously, FIG. 3 is a top schematic view of an inner part of a vehicle according to an embodiment of the present disclosure. The sensing information may include the first position 301 of the first passenger, and the second position 302 of the second passenger. The storage unit may be disposed to store storage information, and the storage information may include a first permission corresponding to the first position 301 and a second permission corresponding to the second position 302. The control unit 111 may be coupled to the first sensing device 114 and the storage unit 112, and may be disposed to determine that the first passenger has the first permission and determine that the second passenger has the second permission based on the sensing information and the storage information. The display device 113 may be coupled to the control unit 111 and includes a first area R1 and a second area R2.

The vehicle may have different modes, or the electronic device may have different modes. The control unit 111 may provide different permissions to different passengers sitting in different positions according to different modes. For example, a vehicle may have a first mode and a second mode. In the first mode, the first permission may include allowing the first passenger sitting in the first position 301 to operate on the first area R1, and the second permission may include allowing the second passenger sitting in the second position 302 to operate on the second area R2.

According to some embodiments, a passenger operating on a certain area in the display device 113 may indicate that the passenger is allowed to control functions in the image displayed in a certain area in the display device 113. For example, the display image in a certain area has a volume adjustment function. Passengers may adjust the volume by direct touch, floating touch or voice control. The above operation methods are only examples, and the disclosure is not limited thereto.

The control unit 111 is coupled to the storage unit 112, the display device 113 and the first sensing device 114. In this embodiment, the control unit 111 may obtain sensing information through the first sensing device 114, and may control the display device 113 to provide corresponding display content and operating functions based on the storage information stored in the storage unit 112 and the sensing information. In this embodiment, the electronic device 110 has a first mode and a second mode. According to some embodiments, modes are switched depending on the speed of the vehicle. For example, the first mode may be a vehicle stop mode, and the second mode may be a driving mode. According to some embodiments, the first mode may be a lower speed driving mode, and the second mode may be a high-speed driving mode, that is, the vehicle travels at a first speed in the first mode, and the vehicle travels at a second speed in the second mode, and the second speed is greater than the first speed. According to some embodiments, the first mode may be, for example, a vehicle stop mode (i.e., a high safety mode). The second mode may be, for example, a normal driving mode or a high-speed mode (i.e., a low safety mode). According to some embodiments, the first mode and the second mode may be manually switched by passengers in the vehicle. Alternatively, according to some embodiments, the first mode and the second mode may be automatically switched based on the speed of the vehicle. For example, the mode of the vehicle (or electronic device) may be correspondingly switched to the first mode or the second mode based on the sensing information (such as vehicle speed) measured by the third sensing device 116 shown in FIG. 1B.

In this embodiment, the control unit 111 may include a central processing unit (CPU), a graphic processing unit (GPU), or other programmable general or specific-purpose microprocessors, digital signal processors (DSP), application specific integrated circuit (ASIC), programmable logic device (PLD), other similar processing circuits or a combination of these devices.

In this embodiment, the storage unit 112 may include any type of fixed or removable random access memory (RAM), read-only memory (ROM), flash memory, hard disk or other circuits or chips with similar functions or a combination of these devices, circuits and chips.

In the embodiment, the display device 113 may include a display panel and a touch panel to provide display and touch control functions. The display panel may include, for example, a liquid crystal or a light emitting diode (LED). The light emitting diode may include, for example, an organic light emitting diode (OLED), an inorganic light emitting diode, a mini LED, a micro LED, or a quantum dot (QD, for example, may be QLED, QDLED), fluorescence, phosphor or other suitable materials, and the materials may be freely arranged and combined, but are not limited thereto. The relative structural relationship between the touch electrodes of the touch panel and the display electrodes of the display panel may be in-cell touch, on-cell touch, or out-cell touch. In an embodiment, the display device 113 may also include multiple screens disposed in different areas of the vehicle 100, and the multiple screens may include a display panel and a touch panel respectively.

In the embodiment, the first sensing device 114 may include one or more sensing units. In the embodiment, the first sensing device 114 may be disposed to sense the number of passengers sitting in the vehicle 100 and the seating arrangement of each passenger, wherein the first sensing device 114 may include, for example, at least one of an image sensor, a pressure sensor, and a distance sensor, but the disclosure is not limited thereto. For example, image sensors may be disposed to implement visual sensing to determine the seating arrangement of passengers. Alternatively, different pressure sensors may be disposed on each seat, so that the control unit 111 is able to determine whether there is a passenger sitting on the corresponding seat based on the pressure sensing results. The vehicle 100 may be a land transport (e.g., a vehicle), a water transport, or an air transport, and is not limited in the present disclosure. For convenience of explanation, a vehicle is used as an example in the following description, but is not used to limit the present disclosure.

In this embodiment, the control unit 111 may control the first sensing device 114 to perform relevant sensing operations by outputting a synchronization control signal to the first sensing device 114. The control unit 111 may receive sensing information from the first sensing device 114. The control unit 111 may determine the safety mode based on the sensing information to control the display device 113 to provide corresponding functions. For example, the first sensing device 114 may acquire the sitting position of each passenger in the vehicle, and the control unit 111 may output the judgment result of the safety mode to the vehicle control unit 120 so that the vehicle control unit 120 is able to perform corresponding vehicle control function.

In the embodiment, the control unit 111 may classify the types and levels of the sensing signals according to the storage information pre-stored by the storage unit 112 to determine the current safety mode of the vehicle 100 and distinguish permissions for different seats in operating the display device 113.

Figure 1B:
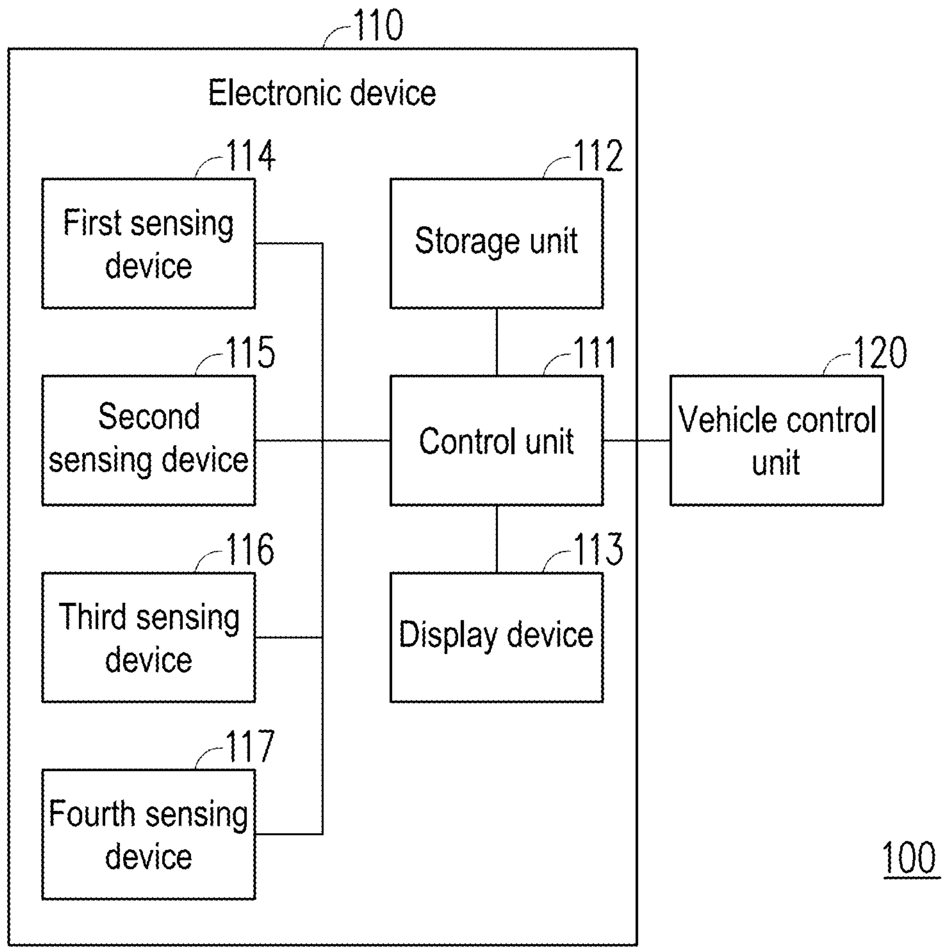
FIG. 1B is a schematic view of an electronic device according to another embodiment of the present disclosure.

FIG. 1B is a schematic view of an electronic device according to another embodiment of the present disclosure. Referring to FIG. 1B, the vehicle 100 includes an electronic device 110 and a vehicle control unit (VCU) 120. The electronic device 110 may be an in-vehicle electronic device and is disposed in the vehicle 100. The electronic device 110 includes a control unit 111, a storage unit 112, a display device 113, a first sensing device 114, a second sensing device 115 and a third sensing device 116. The control unit 111 is coupled to the storage unit 112, the display device 113, the first sensing device 114, the second sensing device 115 and the third sensing device 116. In the embodiment, the control unit 111 may obtain a plurality of sensing information through the first sensing device 114, the second sensing device 115 and the third sensing device 116, and control the display device 113 to provide corresponding display content and operating functions according to the storage information stored in the storage unit 112 and the plurality of sensing information. In the embodiment, the electronic device 110 has a first mode and a second mode. The first mode may be, for example, a vehicle stop mode (i.e., a high safety mode). The second mode may be, for example, a normal driving mode or a high-speed mode (i.e., a low safety mode).

In the embodiment, the first sensing device 114, the second sensing device 115, and the third sensing device 116 may each include one or more sensing units. In the embodiment, the first sensing device 114 may be disposed to sense the number and positions of passengers sitting in the vehicle 100, wherein the first sensing device 114 may include, for example, at least one of an image sensor, a pressure sensor, and a distance sensor, but the disclosure is not limited thereto. For example, the image sensor may be disposed to implement visual sensing to determine the seats of passengers. Alternatively, individual pressure sensors may be provided on each seat, so that the control unit 111 is able to determine whether there is a passenger sitting on the corresponding seat based on the pressure sensing results. In the embodiment, the second sensing device 115 may be disposed to identify the passenger, wherein the second sensing device 115 may include, for example, at least one of infrared sensors, time of flight (ToF) sensors, millimeter wave sensors, fingerprint recognition sensors, facial recognition sensors, and voiceprint recognition sensors, but the disclosure is not limited thereto.

In an embodiment, the image sensing unit of the first sensing device 114 and the millimeter wave sensor of the second sensing device 115 may be used to sense the seats of multiple passengers simultaneously. In the embodiment, the third sensing device 116 may sense the environment outside the vehicle 100 to obtain corresponding sensing information (such as vehicle speed and/or vehicle position, etc.), wherein the third sensing device 116 may, for example, include at least one of a vehicle speed sensing unit, a radar sensing unit, an image sensor and a distance sensor, but the disclosure is not limited thereto. As shown in FIG. 1B, the electronic device 110 may further include a fourth sensing device 117 coupled to the control unit 111. The fourth sensing device 117 may, for example, include one or more image sensors, and may be disposed to implement visual sensing to determine passenger's gesture and/or posture. In addition, the number and type of sensing devices of the present disclosure are not limited to the above examples. Also, the disclosure does not limit the arrangement positions of the first sensing device 114, the second sensing device 115, the third sensing device 116, and the fourth sensing device 117 respectively inside or outside the vehicle 100.

In the embodiment, the control unit 111 may control the first sensing device 114, the second sensing device 115, the third sensing device 116 and the fourth sensing device 117 to perform related sensing operations by outputting different synchronization control signals to the first sensing device 114, the second sensing device 115, the third sensing device 116 and the fourth sensing device 117. The control unit 111 may receive a plurality of sensing information from the first sensing device 114, the second sensing device 115, the third sensing device 116 and the fourth sensing device 117. The control unit 111 may perform safety mode judgment based on the plurality of sensing information to operate the display device 113 to perform corresponding functions, and the control unit 111 may output the result of the safety mode judgment to the vehicle control unit 120, so that the vehicle control unit 120 may perform corresponding vehicle control functions.

In the embodiment, the control unit 111 may classify the types and levels of the sensing signals according to the storage information pre-stored by the storage unit 112 to determine the current safety mode of the vehicle 100 and distinguish permissions for different seats in operating the display device 113.

Figure 2:
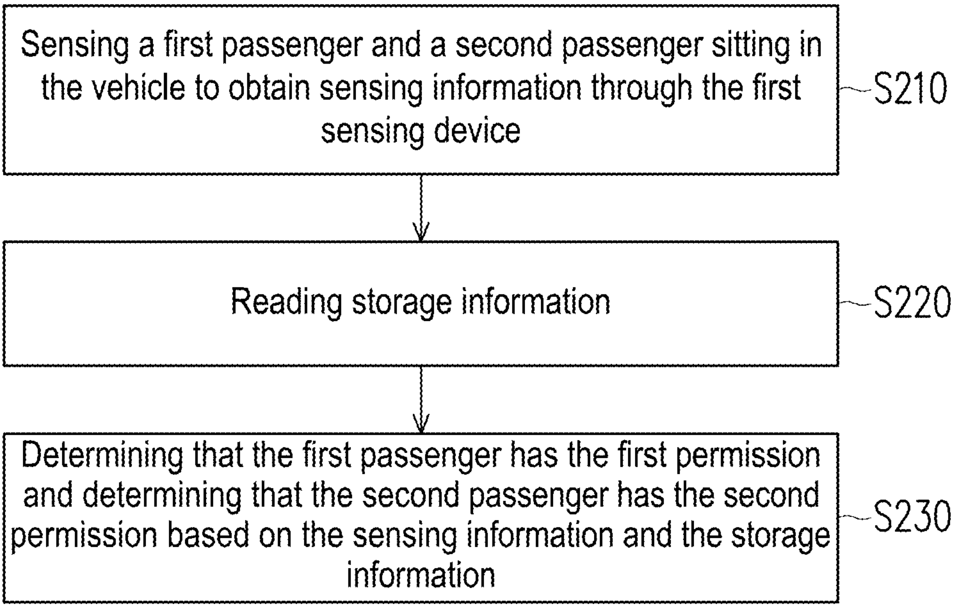
FIG. 2 is a flow chart of a control method of an electronic device according to an embodiment of the present disclosure.

FIG. 2 is a flowchart of a control method of an electronic device according to an embodiment of the present disclosure. Referring to FIG. 1A and FIG. 2, the electronic device 110 may perform the following steps S210 to S230. In step S210, the control unit 111 may sense the first passenger and the second passenger sitting in the vehicle through the first sensing device 114 to obtain sensing information. The sensing information includes the first position of the first passenger and the second position of the second passenger. In step S220, the control unit 111 may read the storage unit 112 to obtain storage information. The storage information includes a first permission corresponding to the first position and a second permission corresponding to the second position. In step S230, the control unit 111 may determine that the first passenger has the first permission and determine that the second passenger has the second permission based on the sensing information and the storage information. In the embodiment, the vehicle 100 (or the electronic device 110) may have a first mode and a second mode. In the first mode, the first permission may include allowing the first passenger to operate on the first area, and the second permission may include allowing the second passenger to operate on the second area.

Referring to FIG. 3, compared with the first passenger sitting in the first position 301, the second passenger sitting in the second position 302 is further away from the first area R1. According to some embodiments, in the second mode of the vehicle, the second permission of the second passenger includes not allowing the second passenger to operate on the first area R1. The first mode may be a vehicle stop mode, and the second mode may be a driving mode.

According to some embodiments, the permission may be a permission that allows the passenger to operate a specific function, or may be a permission that does not allow the passenger to operate a specific function. For example, the permission may be a permission that allows or does not allow the passenger to execute a certain application program displayed on the display image of the display device. For example, the permissions may be a permission that allows or does not allow the passenger to perform navigation. For example, the permission may be a permission that allows or does not allow the passenger to adjust the air volume of the air conditioner. For example, the permission may be a permission that allows or does not allow the passenger to perform the in-meeting report. For example, the permission may be a permission that allows or does not allow the passenger to make consumption. The above permissions are examples only and are not intended to limit this disclosure. The above-mentioned passengers who have been granted permission may be passengers sitting in specific positions. The passenger's seat may be acquired through sensing by the first sensing device 114.

Specifically, the passenger may activate the electronic device 110 and the vehicle control unit 120. The control unit 111 may activate the first sensing device 114. The control unit 111 may activate the first sensing device 114 to perform related sensing operations. The control unit 111 may read the sensing information provided by the first sensing device 114 and the storage information provided by the storage unit 112. The sensing information may include position information of passengers sitting in the vehicle 100. The control unit 111 may read the relevant permission setting data stored in the storage unit 112 in advance. The control unit 111 may analyze the sensing information to determine the passenger's position. The control unit 111 may determine the passenger's permission according to the passenger's position and whether the electronic device 110 is operated in the first mode or the second mode.

Figure 4:
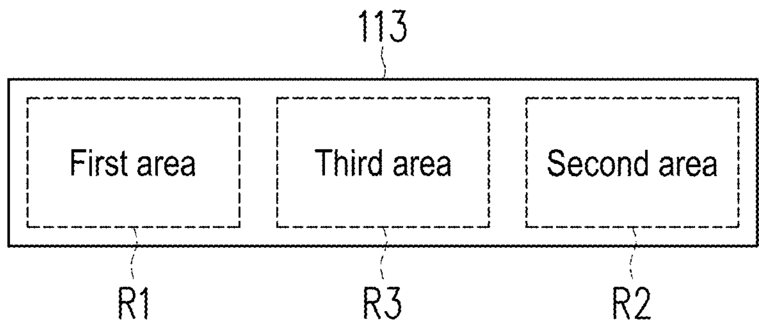
FIG. 4 is a schematic view of a display device according to an embodiment of the present disclosure.
Figure 4:
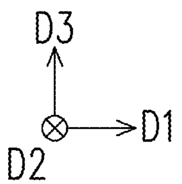

Referring to FIG. 1A, FIG. 3, and FIG. 4, FIG. 4 is a schematic view of a display device according to an embodiment of the present disclosure. In the embodiment, as shown in FIG. 3, the vehicle 100 includes a vehicle body 300. The front direction of the vehicle body 300 of the vehicle 100 may face the direction D2. Directions D1 to D3 are perpendicular to each other. The vehicle body 300 includes a driver's seat position 301 at the front, a front passenger's seat position 302, and vehicle rear seat positions 303 to 305. It should be noted that the first sensing device 114 may include a plurality of sensors, and the plurality of sensors are respectively disposed to sense the driver's seat position 301, the front passenger's seat position 302, and the vehicle rear seat positions 303 to 305 to generate multiple corresponding sensing information. The control unit 111 may activate corresponding functional units and devices corresponding to different positions according to the plurality of sensing information. For example, the driver's seat position 301 and the front passenger's seat position 302 may correspond to an air-conditioning fan control unit or a lighting adjustment unit. The control unit 111 may control the air-conditioning fan control unit or the lighting adjustment unit according to the touch control result of the control interface displayed on the display device 113 according to the driver or the front passenger sitting in the driver's seat position 301 or the front passenger's seat position 302.

As shown in FIG. 3, the display device 113 may be disposed in front of the front seat of the vehicle body 300 so that the driver and front passenger may directly touch the display device 113, and the passengers in the back seat may perform floating touch on the display device 113. The display device 113 may provide display and touch control functions in a direction opposite to the direction D2. However, the number and arrangement positions of the display devices of the present disclosure are not limited to those shown in FIG. 3.

As shown in FIG. 3 and FIG. 4, the display and touch control area of the display device 113 may include a first area R1, a second area R2, and a third area R3. The first area R1, the second area R2, and the third area R3 may be disposed in the same display panel. The first area R1, the second area R2 and the third area R3 may display different display images. The first area R1 may be closest to the driver's seat position 301, for example, in the direction D2, the first area R1 may be disposed in front of the driver's seat position 301. The second area R2 may be closest to the front passenger's seat position 302, for example, in the direction D2, the second area R2 may be disposed in front of the front passenger's seat position 302. Compared with the first passenger sitting in the first position 301, the second passenger sitting in the second position 302 is farther away from the first area R1 and closer to the second area R2. Compared with the second passenger sitting in the second position 302, the first passenger sitting in the first position 301 is further away from the second area R2 and closer to the first area R1.

In the direction D1, the third area R3 may be disposed between the first area R1 and the second area R2. For example, in the direction D1, the third area R3 may be disposed between the driver's seat position 301 and the front passenger's seat position 302. FIG. 3 and FIG. 4 are illustrated with the driver's seat position 301 on the left as an example, but this disclosure is not limited thereto. According to some embodiments, the driver's seat position may also be on the right.

According to some embodiments, the first area R1 may be an instrument area, and the image displayed in the first area R1 may include driving-related information, such as fuel level (such as 613 in FIG. 6A), driving mileage, driving speed (such as 611 in FIG. 6A), the distance to the vehicle in front (such as 612 in FIG. 6A), the lights on the vehicle body . . . etc. In the permitted mode and for passengers with permissions, the passenger is allowed to operate on the first area R1. For example, the passenger may control the lights, such as direction lights, headlights, taillights and so on, on the vehicle body by touching the first area R1.

According to some embodiments, the second area R2 may be an audio-visual area or an entertainment area. In permitted mode and for passengers with permission, the passenger may operate on the second area R2. For example, the passenger may control the second area R2 to play a video by touching the second area R2.

According to some embodiments, the third area R3 may be a central control area. In permitted mode and for passengers with permissions, the passenger is allowed to operate on the third area R3. For example, the passengers may operate the navigation function, control the air volume of the air conditioner, control the volume of the stereo, and so on by touching the third area R3.

According to some embodiments, the first area R1, the second area R2, and the third area R3 may be disposed in different display panels. For example, the first area R1, the second area R2, and the third area R3 may be three independent display panels. Or, for example, the first area R1 and the third area R3 may be disposed in the same display panel, and the second area R2 may be disposed in another display panel. Or, for example, the third area R3 and the second area R2 may be disposed in the same display panel, and the first area R1 may be disposed in another display panel.

Specifically, the first position may be the driver's seat position 301 and the second position may be the front passenger's seat position 302. If the control unit 111 determines that the vehicle 100 is operating in the first mode based on the sensing information of the current vehicle speed, the first permission includes allowing the first passenger (i.e., the driver) to operate on the first area R1 of the display device 113, and the second permission includes allowing the second passenger (i.e., the front passenger) to operate on the second area R2 of the display device 113, wherein the first mode may be, for example, a vehicle stop mode (i.e., a high safety mode). Also, in the first mode, the first permission may further include allowing the first passenger to operate on the second area R2 of the display device 113, and the second permission may further include allowing the second passenger to operate on the first area R1 of the display device 113. In other words, in the vehicle stop mode, which is the high safety mode, the driver and the front passenger may perform cross-area operations on the display device 113.

In the embodiment, if the control unit 111 determines that the vehicle 100 is operating in the second mode based on the sensing information related to the current vehicle speed (for example, sensing information obtained through the third sensing device 116), then the first permission of the first passenger (i.e., the driver) includes not allowing the first passenger to operate on the first area R1 of the display device 113, wherein the second mode may be, for example, a normal driving mode or a high-speed mode (i.e., a low safety mode). Moreover, in the second mode, the second permission of the second passenger includes not allowing the second passenger to operate on the first area R1 of the display device 113, but the second permission of the second passenger includes allowing the second passenger to operate on the second area R2 of the display device 113. In other words, in the normal driving mode or the high-speed mode of the low safety mode, the first area R1 of the display device 113 cannot be operated by any passenger to ensure driving safety. However, the front passenger is allowed to perform touch control operations on the second area R2 of the display device 113. According to some embodiments, in the case where the electronic device includes a third sensing device 116, the storage unit 112 may be disposed to store storage information corresponding to the third sensing device 116. For example, the storage information may include different vehicle speeds corresponding to different modes. For example, based on the sensing information (such as vehicle speed information) measured by the third sensing device 116, the electronic device may be switched to the first mode or the second mode accordingly. According to the first mode or the second mode, the control unit 111 may grant different permissions to different passengers sitting in different positions. For example, the control unit 111 may determine that the first passenger has the first permission and determine that the second passenger has the second permission.

However, in an embodiment, the electronic device 110 may further include a second sensing device 115, a third sensing device 116 and a fourth sensing device 117 as shown in FIG. 1B. Referring to FIG. 1B, FIG. 3 and FIG. 4, the first sensing device 114, the second sensing device 115, the third sensing device 116 and the fourth sensing device 117 may each include a plurality of sensors, and the plurality of sensors are disposed to sense passenger information in the driver's seat position 301, the front passenger's seat position 302, and the vehicle rear seat positions 303 to 305, respectively, to generate multiple corresponding sensing information. The control unit 111 may activate the first sensing device 114, the second sensing device 115, the third sensing device 116 and the fourth sensing device 117 to perform relevant sensing operations to obtain relevant sensing information. The control unit 111 may sense the biometric features of the first passenger through the second sensing device 115 to obtain corresponding sensing information, wherein the biometric features may be, for example, at least one of facial features, voiceprint features, fingerprint features, and other biometric features. Furthermore, the control unit 111 may sense the environment outside the vehicle 100 through the third sensing device 116 to obtain corresponding sensing information, such as vehicle speed information. In other words, the sensing information may include the passenger's position information, biometric feature information, and current vehicle speed information. The control unit 111 may determine the passenger's permission according to the plurality of sensing information from the first sensing device 114, the second sensing device 115 and the third sensing device 116.

For example, according to some embodiments, as shown in FIG. 1B and FIG. 3, the first sensing device 114 may be used to sense that the first passenger is sitting in the first position 301 (such as the driver's seat position), and the second sensing device 115 may be used to sense whether the identity of the first passenger matches the storage information stored in the storage unit 112. For example, the storage unit 112 may store information on biometric features of passengers who have driving permission. Through the sensing result of the second sensing device 115, it may be determined whether the first passenger has driving permission. Therefore, in the second mode, the first permission of the first passenger may further include a driving permission that allows driving the vehicle 100. In other words, the sensing information may further include recognition result of the driver's identity, and the control unit 111 may only allow pre-registered passengers with driving permission (such as car owners, but not limited to car owners) to drive the vehicle 100.

Specifically, it is assumed that the vehicle body 300 further includes a third passenger. The control unit 111 may sense the third passenger sitting in the vehicle 100 through the first sensing device 113 to obtain corresponding sensing information. In other words, the sensing information may further include the third position of the third passenger. Furthermore, the storage unit 112 may further store a third permission corresponding to the third position. The control unit 111 may determine that the third passenger has the third permission based on the sensing information and the storage information. For example, as shown in FIG. 3, the third position may be one of the vehicle rear seat positions 303 to 305. Compared with the first position 301 and the second position 302 at the front seat, the third position is farther from the display device 113. In the first mode, the third permission of the third passenger includes allowing the third passenger to operate on the second area R2 of the display device 113. For example, the third permission of the third passenger includes allowing the third passenger to operate on the second area R2 of the display device 113 through direct touch control, floating touch control, voice control, etc. In other words, in the vehicle stop mode (first mode) which is the high safety mode, even if the third position 304 is further away from the display device 113 as compared with the first position 301 and the second position 302 at the front seat, the passenger in the rear seat in the third position 304 is allowed to operate on the second area R2 of the display device 113. According to some embodiments, a passenger in the rear seat in the third position 304 may be allowed to operate on other areas (e.g., the first area R1 and the third area R3) of the display device 113.

In an embodiment, as shown in FIG. 3, in the second mode, the third permission of the third passenger includes allowing the third passenger to operate on the second area R2 of the display device 113 in a floating touch control mode. According to some embodiments, in the second mode, the passenger in the rear seat in the third position 304 may be allowed to operate in a floating touch control manner on other areas (such as the first area R1 and the third area R3) of the display device 113, but the passenger in the rear seat in the third position 304 is not allowed to operate in a direct touch control manner on all areas R1 to R3 of the display device 113 to avoid disturbance to the passengers sitting in the front seats.

The control unit 111 may, for example, perform posture or gesture recognition on the third passenger through the image sensor of the fourth sensing device 117 to implement the floating touch control function. In addition, in the second mode, for safety reasons, the third permission of the third passenger includes not allowing the third passenger to operate on the first area R1 of the display device 113. In this way, it is possible to prevent the driving behavior of the first passenger sitting in the driver's seat position 301 from being disturbed, or it is possible to prevent the behavior of the first passenger sitting in the driver's seat position 301 and operating on the first area R1 from being disturbed. In other words, in the normal driving mode or the high-speed mode which is the low safety mode, any passenger in the rear seat is not allowed to operate on the first area R1 of the display device 113 to ensure driving safety.

In addition, in an embodiment, in the second mode, the control unit 111 may also operate the vehicle 100 to perform automatic driving based on the sensing information. In this regard, the control unit 111 may, for example, confirm the driver's position and driver's identity through a plurality of sensing units of the first sensing device 114 and the second sensing device 115, and may confirm whether the current vehicle speed is a normal driving mode or a high-speed mode through the third sensing device 116. The control unit 111 may determine whether to allow the driver to operate in an automatic driving mode based on the sensing information. According to some embodiments, the third sensing device 116 may sense the environment outside the vehicle and the speed of the vehicle. For example, the storage unit 112 may be disposed to store storage information corresponding to whether different environments outside the vehicle and different speeds of the vehicle satisfy the automatic driving mode. According to the sensing information obtained by the third sensing device 116 and the storage information stored in the storage unit 112, the control unit 111 may decide whether to allow the driver to activate the automatic driving function and whether to operate the vehicle for automatic driving.

In another example, the safety mode of the present disclosure may also have different differentiation standards according to different needs. As shown in Table 1 below, the usage conditions of the display device 113 may also comply with the specifications in Table 1 below, but the disclosure is not limited thereto. Table 1 may include a first mode which is the high safety mode (i.e., vehicle stop mode), a second mode which is the low safety mode (i.e., high-speed mode), and a third mode which is the medium safety mode (i.e., general driving mode), and includes corresponding implementation condition. Compared with the second mode which is the low safety mode (i.e. the high-speed mode), the vehicle speed in the medium safety mode (i.e., the normal driving mode, which may be called the third mode) may be lower. That is, the order of vehicle speed is that the speed in the second mode is higher than the speed in the third mode, and the speed in the third mode is higher than the speed in the first mode. The control unit 111 may implement each operation mode in Table 1 below, for example, through a microcontroller unit (MCU) for gear shifting, a vehicle speed sensor, a microcontroller for braking, and a touch sensor for the steering wheel.

TABLE 1

| Safety mode | Operating conditions (or the passenger's permission) | Implementation conditions |
| --- | --- | --- |
| Low (second mode) | The driver is not allowed to touch the first area R1, the second area R2, and the third area R3 of the display device 113. The front passner is not allowed to touch and operate on the first area R1 of the display device 113, but is allowed to operate on the second area R2 and the third area R3 of the display device 113. The passenger in the rear seat is not allowed to touch and operate on the first area R1 and the third area R3 of the display device 113, but is allowed to operate on the second area R2. | The vehicle 100 is operated in D gear, the vehicle speed is higher than 80 kilometers per hour, the driver's feet are placed on the brake pedal, both hands are holding the steering wheel, or the driver sets that the first area R1 of the display device 113 is locked in a mode of not providing a touch control function. |
| Medium (third mode) | The driver is not allowed to touch and operate on the first area R1 and the second area R2 of the display device 113, but is allowed to operate on the third area R3 of the display device 113. The front passenger is not allowed to touch and operate on the first area R1 of the display device 113, but is allowed to operate on the second area R2 and the third area R3 of the display device 113. The passenger in the rear seat is not allowed to touch and operate on the first area R1 and the third area R3 of the display device 113, but is allowed to operate on the second area R2. | The vehicle 100 is operated in D gear or R gear, the vehicle speed is lower than 80 kilometers per hour, the driver's one hand is holding the steering wheel, or the driver sets that the second area R2 of the display device 113 is locked in a mode of providing a touch control function. |
| High (first mode) | The driver is allowed to touch and operate on the first area R1, the second area R2 and the third area R3 of the display device 113. The front passenger is allowed to touch and operate on the first area R1, the second area R2, and the third area R3 of the display device 113. The passenger in the rear seat is allowed to perform floatting touch control on the second area R2 or the third area R3 of the touch display device 113. | The vehicle 100 is operated in P gear, the vehicle is started but the steering wheel is not moving, or the driver sets that the first area R1 of the display device 113 is locked in a mode of providing a touch control function. |

Referring to FIG. 1B, FIG. 3, FIG. 4, and FIG. 5, FIG. 5 is a flow chart of mode judgment according to an embodiment of the present disclosure. In this embodiment, the control unit 111 may respectively determine the display content in the areas of the display device 113 according to the following steps S510 to S550. In step S510, the first sensing device 114 may be used to determine whether the first passenger's position is in the driver's seat (in other words, sensing whether there is a passenger in the first position). If the result is negative, step S540 is performed, and at least a part of the display device 113 is disposed to display the multimedia image. In detail, at least one area (at least one of the first area R1, the second area R2, and the third area R3) in the display device 113 may display a multimedia image. For example, the first area R1 in the display device 113 may display a multimedia image. Moreover, step S550 is performed, the control unit 111 determines that the first passenger has the first permission, wherein the first permission includes allowing the first passenger (the first passenger under such condition is not sitting in the driver's seat) to operate the multimedia image in the first area R1.

If step S510 is performed, after it is determined that the first passenger position is in the driver's seat, step S520 may be further performed to determine whether the first passenger's identity is the car owner through the second sensing device 115 (such as through biometric recognition), and grant different permissions depending on whether the driver is the car owner. For example, if the driver is the car owner, the driver is granted all driver's permissions, for example, including navigation, entertainment, shopping, etc. If the driver is not the car owner, the driver is not granted all driver's permissions but only some permissions. For example, non-car owners are allowed to perform functions such as navigation or entertainment, but do not have permission to make consumption (for example, non-car owners are not allowed to pay for upgrading car software). According to some embodiments, step S520 does not need to be performed. Therefore, after step S510 is performed to determine that the first passenger's position is in the driver's seat, step S530 may be directly performed afterwards.

If it is determined that the first passenger's position is in the driver's seat and step S520 is performed to determine that the first passenger's identity is not the car owner through the second sensing device 115, step S540 may be performed. Moreover, step S550 is performed, the control unit 111 determines that the first passenger has the first permission, wherein the first permission includes allowing the first passenger (the first passenger under such condition is sitting in the driver's seat) to operate the multimedia image in the first area R1. If the passenger is the car owner, step S530 is performed to determine whether the current vehicle state is in the vehicle stop mode (such as the first mode) through the third sensing device 116. If the current vehicle state is the vehicle stop mode (such as the first mode), steps S540 and S550 may be performed as described above. In step S540, at least a part of the display device 113 displays a multimedia image (such as the first image).

If step S530 is performed and it is determined that the current vehicle state is not the vehicle stop mode (e.g., the second mode), step S560 may be performed. In the second mode, at least part of the display device 113 displays a driving image (e.g., the second image). The first image and the second image are different. Furthermore, step S570 may be performed, and the control unit 111 determines that the first passenger has a first permission, wherein the first permission includes not allowing the first passenger to operate at least part of the functions in the driving image in the first area R1.

Specifically, in the embodiment, the control unit 111 may determine the seats of the passenger in the vehicle 100 through a variety of sensors of the first sensing device 114, and the control unit 111 may sense the biometric features of the passengers to obtain corresponding sensing information through a variety of biometric sensors of the second sensing device 115. If the control unit 111 determines that the passenger is not the driver based on the passenger's position information and passenger's identity information, the control unit 111 may control the corresponding display and touch control area (for example, the second area R2 or the third area R3 in FIG. 4) of the display device 113 to enable the passenger's and front passenger's operation. On the other hand, if the control unit 111 determines that the passenger is the driver based on the passenger's position information and passenger's identity information, the control unit 111 may further determine whether the current vehicle state is the vehicle stop mode (step S530). If the result is positive, the control unit 111 may control the corresponding display and touch control area (such as the first area R1, the second area and/or the third area R3 in FIG. 4) of the display device 113 to enable the multimedia function and display the multimedia image. If the result is negative, the control unit 111 may control the corresponding display and touch control area (such as the first area R1 or the third area R3 in FIG. 4) of the display device 113 to enable the driving function and display the driving image.

Figure 6A:
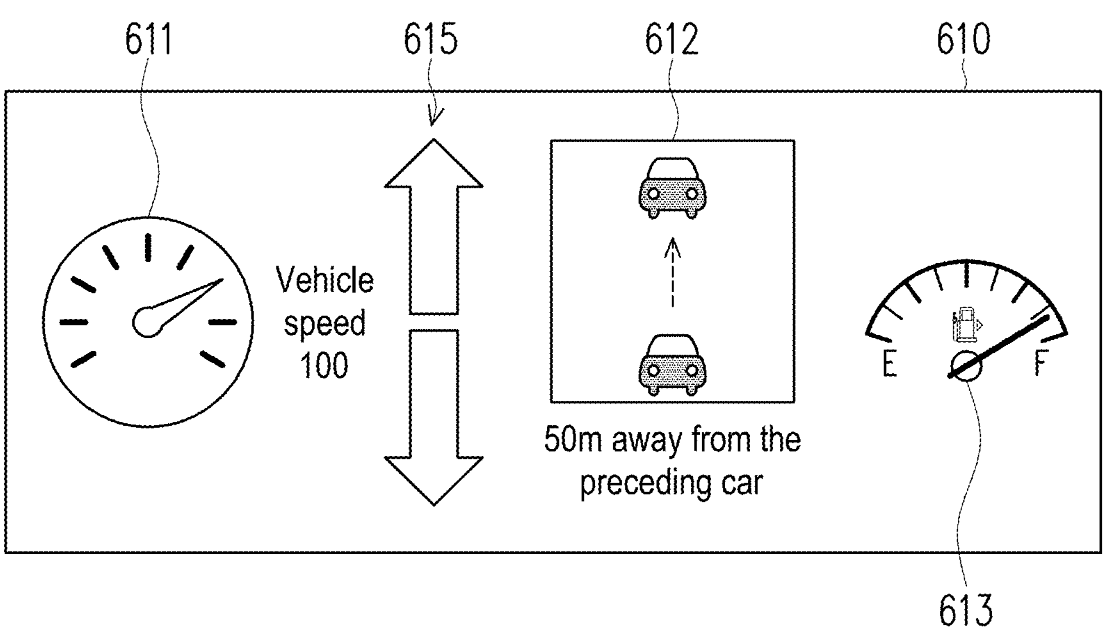
FIG. 6A is a schematic view of a driving image according to an embodiment of the present disclosure.
Figure 6B:
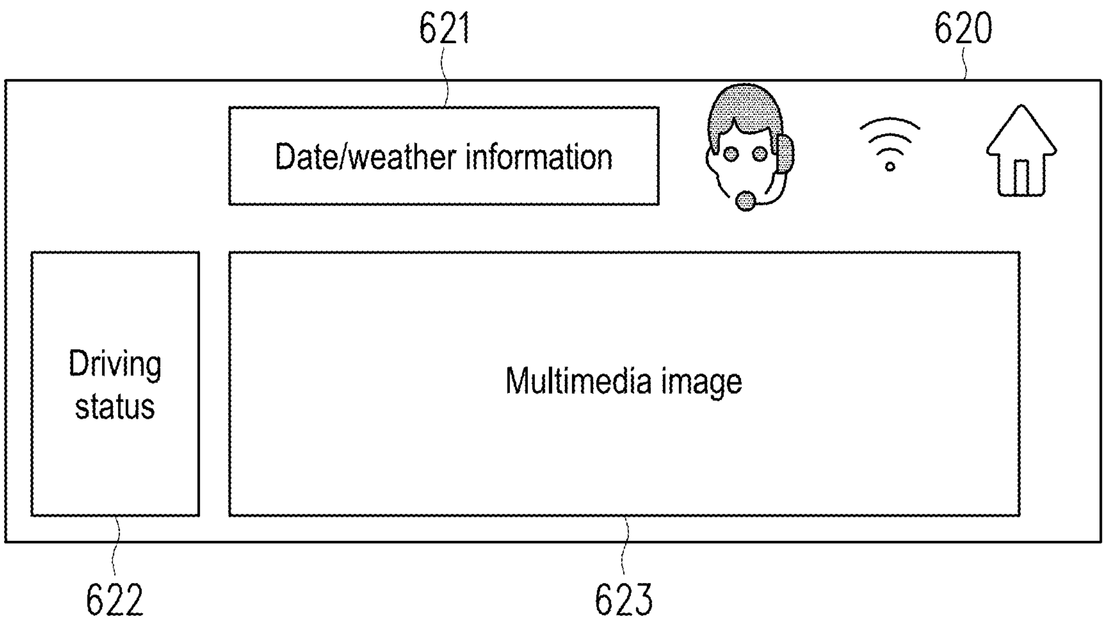
FIG. 6B is a schematic view of a multimedia image according to an embodiment of the present disclosure.

With reference to FIG. 3, FIG. 6A and FIG. 6B, FIG. 6A is a schematic view of a driving image according to an embodiment of the present disclosure, and FIG. 6B is a schematic view of a multimedia image according to an embodiment of the present disclosure. For example, if the passengers include a driver (that is, there is a passenger in the driver's seat), the control unit 111 may control the first area R1 of the display device 113 of FIG. 3 to display the display image 610 of FIG. 6A, wherein the display image 610 may, for example, provide current vehicle speed information 611, front vehicle distance information 612, current fuel level information 613, and touch icon 615, etc., but the disclosure is not limited thereto. For example, the control unit 111 may, for example, allow the driver to operate the touch icon 615 in the driving image 610 in the first area R1 to operate the vehicle to accelerate or decelerate through touch, or to operate the vehicle to maintain a distance from the preceding vehicle through touch, and the control unit 111 does not allow the first passenger to operate other functions in the driving image 610 in the first area R1. The touch icon 615 may also correspond to other functions, such as audio volume. For example, by performing a touch control operation on the upper and lower sides of the touch icon 615, the audio volume may be adjusted. The functions of the above touch icon 615 are only examples, and the present disclosure is not limited thereto.

Figure 5:
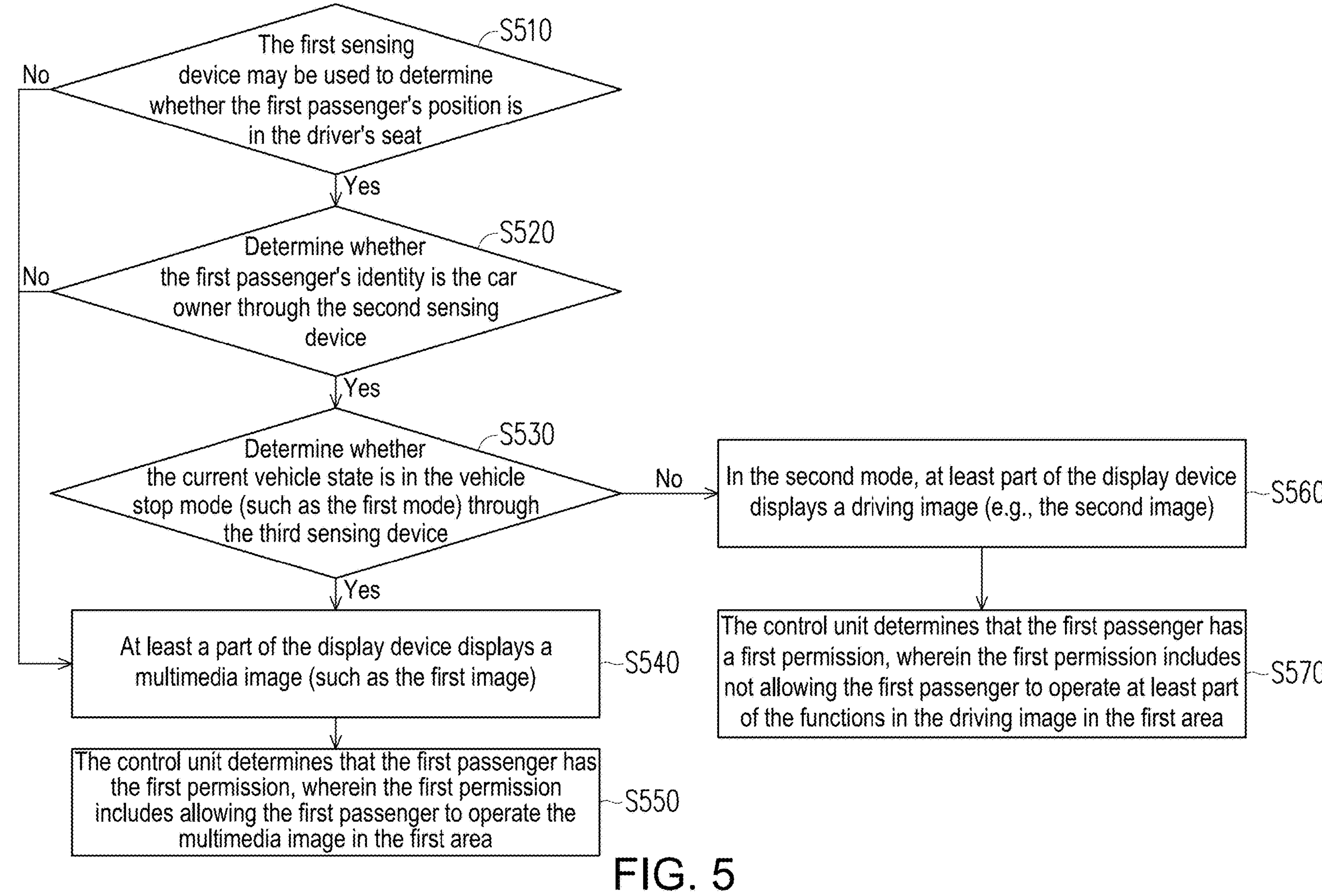
FIG. 5 is a flow chart of mode judgment according to an embodiment of the present disclosure.

Referring to FIG. 5 and FIG. 6B both, if the passengers include the driver and the vehicle 100 is currently in a stop state (in the first mode) or traveling in a non-high-speed state (in the third mode), the control unit 111 may control the first area R1 or the third area R3 of the display device 113 of FIG. 3 to display a display image 620 as shown in FIG. 6B, wherein the display image 620 may include, for example, date/weather information 621, driving status 622, and multimedia image 623, but the disclosure is not limited thereto. In addition, if there is no passenger in the driver's seat, the control unit 111 may also control at least one of the second area R2 and the third area R3 of the display device 113 in FIG. 3 to display the display image 620 in FIG. 6B. According to some embodiments, the second area R2 and the third area R3 may be combined to display the display image 620 in FIG. 6B.

Figure 7:
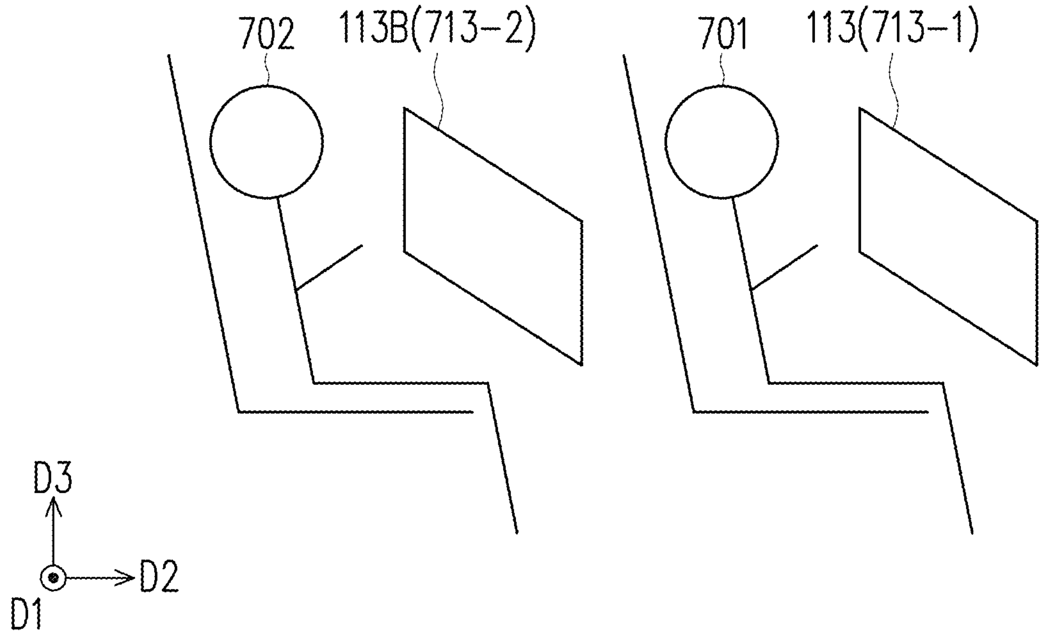
FIG. 7 is a schematic view of the positions of passengers and the display device in the vehicle according to an embodiment of the present disclosure.

FIG. 7 is a schematic view of the positions of passengers and the display device in the vehicle according to an embodiment of the present disclosure. Referring to FIG. 1 and FIG. 7, in the embodiment, the display device 113 may include a first area 713-1 (R1). FIG. 7 only shows the first area 713-1 of the display device 113. As shown in FIG. 3 and FIG. 4, the display device 113 may include a second area and/or a third area, which will not be described again here. According to some embodiments, the electronic device may include another display device 113B including the fourth area 713-2. The display device 113 and said another display device 113B may be separate display devices. As shown in FIG. 7, the display device 113 may be disposed in front of the driver's seat for the driver 701 to view or operate. Furthermore, said another display device 113B may be disposed in front of the rear seat passenger position (for example, the seat back of the driver's seat or the seat back of the front passenger seat) for the rear seat passenger 702 to view or operate. The functions provided by the display device 113 may be implemented according to the above-mentioned embodiments, and the corresponding areas in the display device 113 may display corresponding content and provide corresponding touch control permissions according to the different needs of different passengers. In an embodiment, the first area 713-1 of the display device 113 may also display the display image 610 as shown in FIG. 6A, and the fourth area 713-2 of said another display device 113B may display the display image 620 as shown in FIG. 6B.

Figure 8:
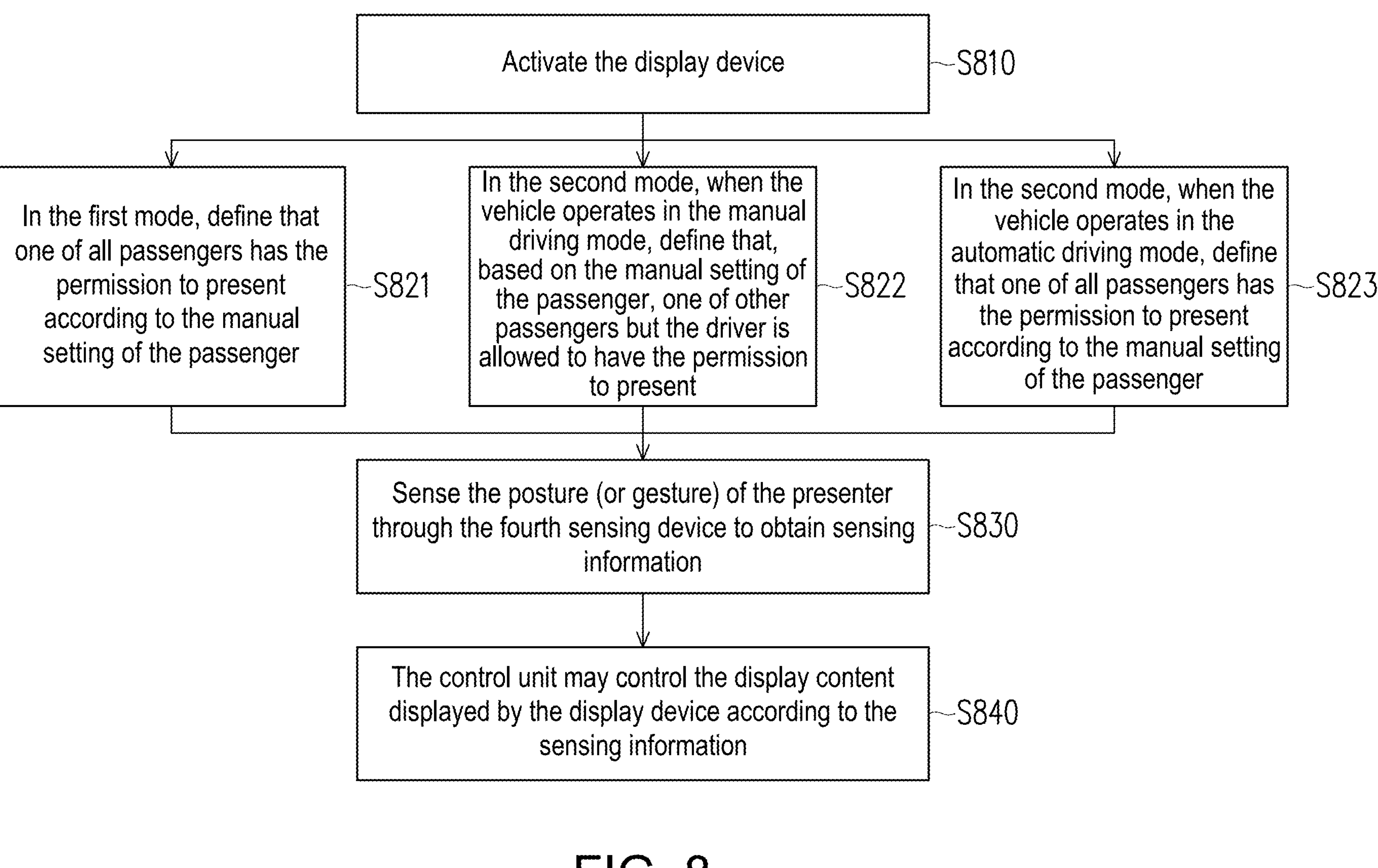
FIG. 8 is an operation flow chart of an electronic device according to an embodiment of the present disclosure.

FIG. 8 is a flow chart of an operation of an electronic device according to an embodiment of the present disclosure. Referring to FIG. 1 and FIG. 8, in the embodiment, the display device 113 may further provide a presentation function. The entire image of the display device 113 or one of the multiple display areas may display a presentation image. In the embodiment, after the control unit 111 confirms multiple passengers' identities and their corresponding seats according to the above embodiment, the control unit 111 may perform the following steps S810 to S840 to provide a presentation function. In step S810, the control unit 111 may activate the display device 113. The control unit 111 may execute one of the following steps S821 to S823 according to the actual situation. In step S821, in the first mode, the control unit 111 may define that one of all passengers has the permission to present according to the manual setting of the passenger. In step S822, in the second mode, when the vehicle 100 operates in the manual driving mode, the control unit 111 may determine, based on the sensing information obtained by the first sensing device 114, that all the passengers but the driver are allowed to have the permission to present. Also, the control unit 111 may define that one of other passengers but the driver has the permission to present according to the manual setting of the passenger. That is, the control unit 111 will exclude the driver as the presenter in the setting, and will not sense the driver's posture (or gesture) through the fourth sensing device 117. In contrast, in step S823, in the second mode, when the vehicle 100 operates in the automatic driving mode, the control unit 111 may define that one of all passengers has the permission to present according to the manual setting of the passenger. The control unit 111 may have all passengers (including the passenger sitting in the driver's seat) defined as presenters.

In step S830, the control unit 111 may sense the posture (or gesture) of the presenter through the fourth sensing device 117 to obtain sensing information. The control unit 111 may analyze the posture (or gesture) of the presenter. In step S840, the control unit 111 may control the display content displayed by the display device 113 according to the sensing information. In other words, multiple passengers may conduct a briefing meeting in the vehicle 100, and the presenter may control the presentation content of the briefing by, for example, direct touch or floating touch. In this way, the electronic device 110 may provide a convenient and safe briefing meeting function.

Figure 9:
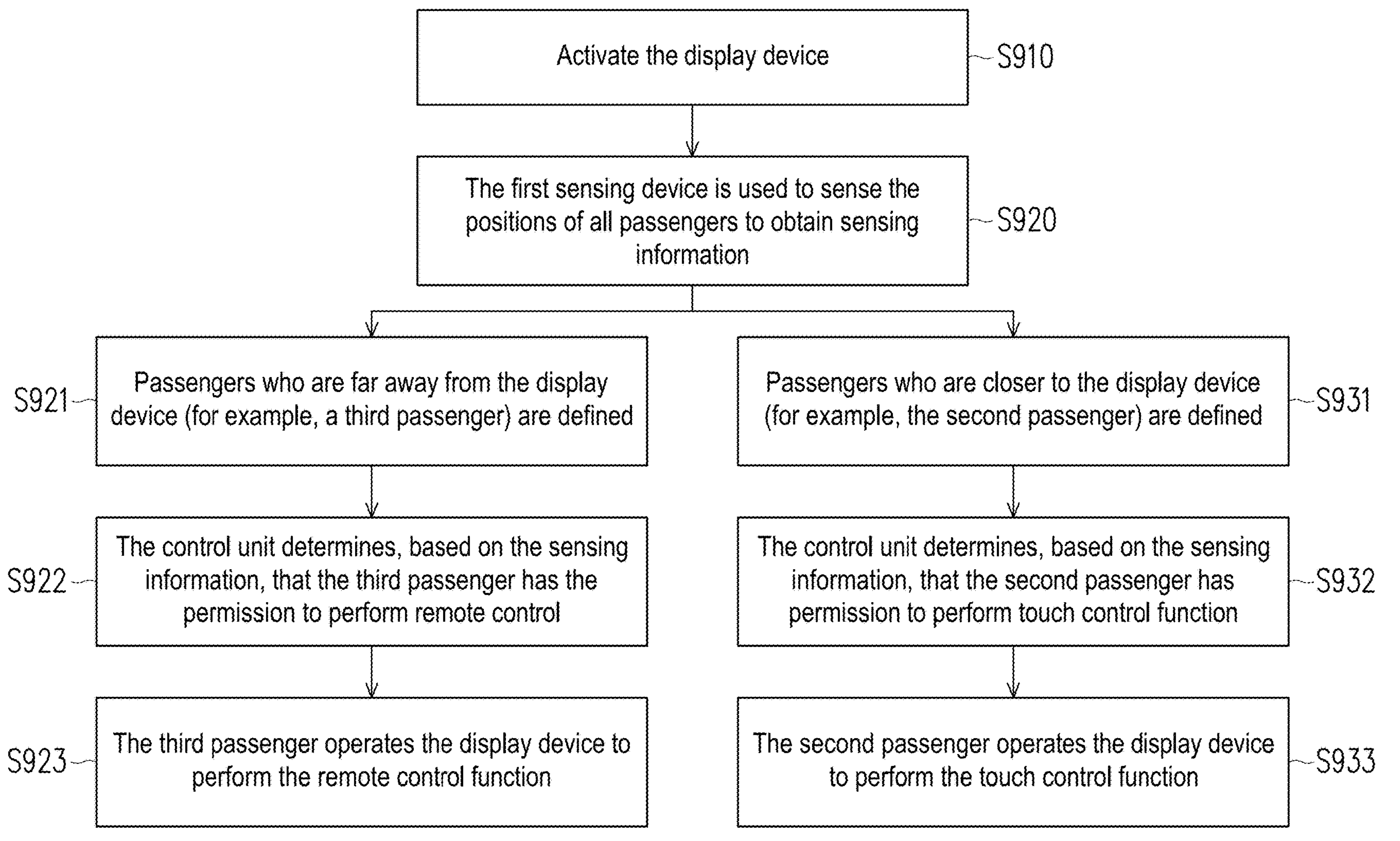
FIG. 9 is an operation flow chart of an electronic device according to an embodiment of the present disclosure.

FIG. 9 is a flow chart of an operation of an electronic device according to an embodiment of the present disclosure. Referring to FIG. 1B, FIG. 3, FIG. 4 and FIG. 9, in the embodiment, after the control unit 111 confirms the identities of multiple passengers and their corresponding seats according to the above embodiment, the control unit 111 may perform the following steps S910 to S933, different permissions are determined based on the passenger's positions. In step S910, the control unit 111 may activate the display device 113. In step S920, the first sensing device 114 is used to sense the positions of all passengers to obtain sensing information. Different passengers are defined according to the distance between the passengers and the display device 113, and the step is divided into steps S921 and S931. The configuration position of the display device 113 may as shown in FIG. 3.

In step S921, passengers who are far away from the display device (for example, a third passenger in the back seat) are defined based on the sensing information. In step S922, the control unit 111 determines, based on the sensing information, that the third passenger has the permission to perform remote control, that is, the permission to perform remote control on the image displayed by the display device 113. In step S923, the third passenger operates the display device 113 to perform the remote control function. In step S931, passengers who are closer to the display device (for example, the second passenger in the front passenger's seat) are defined based on the sensing information. In step S932, the control unit 111 determines, based on the sensing information, that the second passenger has permission to perform touch control function. In step S933, the second passenger operates the display device 113 to perform the touch control function, that is, the permission to perform touch control operation on the image displayed by the display device 113. According to some embodiments, in the first mode and the second mode, the display device 113 may further provide entertainment functions. The entire image of the display device 113 or one of the multiple display areas may display an entertainment image. For example, in step S923, the third passenger may remotely operate the entertainment functions in the entertainment image displayed on the display device 113. The remote control method may be, for example, a floating touch control method, or a remote control may be used to perform the remote control operation. In step S933, the second passenger may operate the entertainment function in the entertainment image displayed on the display device 113 in a direct touch control manner.

For example, taking FIG. 3 as an example, the control unit 111 may allow the driver and the front passenger sitting in the driver's seat position 301 and the front passenger's seat position 302 to operate the display device 113 through direct touch control, and the control unit 111 may allow other passengers sitting in the vehicle rear seat positions 303 to 305 to operate the display device 113 through floating touch control. In addition, when the vehicle 100 is operating in the automatic driving mode, the control unit 111 may also only allow the driver sitting in the driver's seat position 301 to have the permission to operate on a specific area of the display device 113, for example, only allow the driver to have the permission to operate the functions of turning on/turning off the audio and adjusting the audio volume on the first area R1. In this way, the electronic device 110 may provide convenient and safe entertainment functions.

FIG. 10 is a flow chart of an operation of an electronic device according to an embodiment of the present disclosure. Referring to FIG. 1B and FIG. 10, in the embodiment, based on the sensing information obtained by the appropriate sensing device, the control unit 111 may determine that qualified passengers are granted with permission to make consumption. In the embodiment, the control unit 111 may perform the following steps S1010 to S1060 to provide the consumption function. In step S1010, the control unit 111 may activate the display device 113. In step S1020, the control unit 111 may define one of the plurality of passengers as a consumer in a manual setting manner according to the passenger's touch on the display device 113. In step S1022, the control unit 111 may determine whether the defined consumer is in the driver's seat through the first sensing device 114. If the result is positive, step S1024 is executed. If the result is negative, step S1030 is performed.

In step S1024, the control unit 111 may determine whether the current vehicle state is in the stop mode through the third sensing device 116. If the result is negative, step S1026 is performed. If the result is positive, step S1030 is performed. In step S1026, the control unit 111 decides not to allow the defined consumer to have permission to make consumption. In some embodiments, although not shown in FIG. 10, even in step S1024, the control unit 111 determines through the third sensing device 116 that the current vehicle state is not in the stop mode. If the vehicle is operating in the automatic driving mode, step S1030 may also be performed.

In step S1030, the control unit 111 may verify the consumer's identity and perform credit card authentication through the second sensing device 115 to confirm that the consumer has the permission to make consumption. For example, the control unit 111 may allow transactions using online credit cards through facial recognition. In step S1040, the control unit 111 may sense and analyze the consumer's posture (or gesture) through the fourth sensing device 117. In step S1050, when the consumer's posture (or gesture) triggers the function of agreeing to pay or confirming the transaction, the transaction authentication unit outputs the corresponding transaction information to the control unit 111. The transaction authentication unit may identify the consumer's posture (or gesture) to trigger whether to agree to pay or confirm the transaction, and the transaction authentication unit may be disposed inside the control unit 111 or on another control chip outside the control unit 111. In step S1060, the control unit 111 may notify the vehicle control unit 120 according to the transaction information, so that the vehicle control unit 120 controls the vehicle 100 to automatically drive to the pickup location. In this way, the electronic device 110 may provide convenient shopping functions.

In summary, according to some embodiments, the electronic device includes a first sensing device, and sensing information of different passengers' positions may be obtained through sensing by the first sensing device. The control unit may determine that passengers in different seats have different permission to operate on different areas of the display device based on the sensing information and storage information. According to some embodiments, the electronic device of the present disclosure may adjust the display content and touch conditions of the display device according to the passengers' seats, passengers' statuses and the driving state of the vehicle, so as to achieve convenient and safe display touch control function in the vehicle. In some embodiments of the present disclosure, the electronic device may further provide convenient and secure presentation, entertainment or shopping functions.

Finally, it should be noted that the above embodiments are only used to illustrate the technical solution of the present disclosure, but not to limit it; although the present disclosure has been described in detail with reference to the foregoing embodiments, those of ordinary skill in the art should understand that: the technical solutions described in the foregoing embodiments can still be modified, or some or all of the technical features can be equivalently replaced; and these modifications or substitutions do not deviate the essence of the corresponding technical solutions from the scope of technical solutions in the embodiments of the present disclosure.

What is claimed is:

1. An electronic device adaptable for a vehicle, comprising:

a first sensor disposed to sense a first passenger and a second passenger sitting in the vehicle to obtain sensing information, wherein the sensing information comprises a first position of the first passenger and a second position of the second passenger;

a storage circuit disposed to store storage information, wherein the storage information comprises a first permission corresponding to the first position and a second permission corresponding to the second position;

a control circuit coupled to the first sensor and the storage circuit, and disposed to determine that the first passenger has the first permission and determine that the second passenger has the second permission based on the sensing information and the storage information; and a display panel coupled to the control circuit and comprising a first area and a second area, wherein the vehicle has a first mode and a second mode, in the first mode, the first permission comprises allowing the first passenger to operate on the first area, and the second permission comprises allowing the second passenger to operate on the second area, wherein the first mode is a vehicle stop mode, and the second mode is a driving mode, in the second mode, the first permission of the first passenger comprises not allowing the first passenger to operate on the first area.

2. The electronic device according to claim 1, wherein in the first mode, the first permission comprises allowing the first passenger to operate on the second area, and the second permission comprises allowing the second passenger to operate on the first area.

3. The electronic device according to claim 1, wherein the first sensor comprises at least one of an image sensor, a pressure sensor and a distance sensor.

4. The electronic device according to claim 1, wherein in the second mode, the second permission of the second passenger comprises not allowing the second passenger to operate on the first area.

5. The electronic device according to claim 1, wherein in the second mode, the second permission of the second passenger comprises allowing the second passenger to operate on the second area.

6. The electronic device according to claim 1, further comprising:

a second sensor coupled to the control circuit and disposed to sense biometric features of the first passenger to obtain the sensing information.

7. The electronic device according to claim 6, wherein in the second mode, the first permission of the first passenger comprises a permission to drive the vehicle.

8. The electronic device according to claim 6, wherein the second sensor comprises at least one of an infrared sensor, a time of flight (ToF) sensor, and a millimeter wave sensor.

9. The electronic device according to claim 1, wherein the first position is a driver's seat position and the second position is a front passenger's seat position.

10. The electronic device according to claim 1, wherein the first sensor is disposed to sense a third passenger sitting in the vehicle to obtain the sensing information, the sensing information comprises a third position of the third passenger, the third position is a vehicle rear seat position, wherein the storage information comprises a third permission corresponding to the third position, wherein the control circuit is disposed to determine that the third passenger has the third permission based on the sensing information and the storage information, wherein in the first mode, the third permission of the third passenger comprises allowing the third passenger to operate on the second area, in the second mode, the third permission of the third passenger comprises not allowing the third passenger to operate on the first area.

11. The electronic device according to claim 1, further comprising:

a third sensor coupled to the control circuit and disposed to sense an environment outside the vehicle to obtain the sensing information.

12. The electronic device according to claim 11, wherein in the second mode, the control circuit operates the vehicle to perform automatic driving according to the sensing information.

13. The electronic device according to claim 11, wherein the third sensor comprises at least one of a radar sensing unit, an image sensor, and a distance sensor.

14. The electronic device according to claim 1, wherein in the first mode, at least a part of the display panel is disposed to display a first image, in the second mode, at least a part of the display panel is disposed to display a second image, and the first image is different from the second image.

15. The electronic device according to claim 1, wherein the first area and the second area are disposed in a same display panel.

16. The electronic device according to claim 1, wherein a third area is further disposed between the first area and the second area, and the first area, the second area and the third area display different display images.

17. The electronic device according to claim 1, wherein the first area and the second area are disposed in different display panels.

18. A control method of an electronic device adaptable for being disposed in a vehicle, wherein the electronic device comprises a display panel, the display panel comprises a first area and a second area, and the control method comprising:

sensing a first passenger and a second passenger sitting in the vehicle to obtain sensing information, wherein the sensing information comprises a first position of the first passenger and a second position of the second passenger;

reading storage information, wherein the storage information comprises a first permission corresponding to the first position and a second permission corresponding to the second position; and determining that the first passenger has the first permission and determining that the second passenger has the second permission based on the sensing information and the storage information, wherein in a first mode of the vehicle, the first permission comprises allowing the first passenger to operate on the first area, and the second permission comprises allowing the second passenger to operate on the second area, wherein in a second mode of the vehicle, the second permission of the second passenger comprises not allowing the second passenger to operate on the first area, the first mode is a vehicle stop mode, and the second mode is a driving mode, and the second passenger is further away from the first area than the first passenger.

* * * * *